United States Patent [19]
Correa

[11] Patent Number: 5,103,630
[45] Date of Patent: Apr. 14, 1992

[54] DRY LOW $NO_x$ HYDROCARBON COMBUSTION APPARATUS

[75] Inventor: Sanjay M. Correa, Schnectady, N.Y.

[73] Assignee: General Electric Company, Schenectady, N.Y.

[21] Appl. No.: 606,248

[22] Filed: Oct. 31, 1990

Related U.S. Application Data

[63] Continuation of Ser. No. 328,213, Mar. 24, 1989, abandoned.

[51] Int. Cl.$^5$ .............................. F02C 3/10
[52] U.S. Cl. ................ 60/39.161; 60/39.17; 60/39.04; 60/39.181
[58] Field of Search .......... 60/39.181, 39.02, 39.04, 60/39.17, 39.161, 732, 205

[56] References Cited

U.S. PATENT DOCUMENTS

| | | | |
|---|---|---|---|
| 3,228,451 | 1/1966 | Fraser et al. | 60/732 |
| 3,704,587 | 12/1972 | Krieb et al. | 60/39.12 |
| 4,019,314 | 4/1977 | Springmann | 60/39.02 |
| 4,058,974 | 11/1977 | Pfenninger | 60/39.12 |
| 4,095,419 | 6/1978 | Pfenninger | 60/39.12 |
| 4,193,259 | 3/1980 | Muenger et al. | 60/39.04 |
| 4,199,933 | 4/1980 | Pfenninger | 60/39.12 |

FOREIGN PATENT DOCUMENTS

| | | |
|---|---|---|
| 120206 | 3/1984 | European Pat. Off. |
| 861924 | 3/1961 | United Kingdom |
| 1064182 | 4/1967 | United Kingdom |
| 2047265A | 11/1980 | United Kingdom |

OTHER PUBLICATIONS

Carlstrom, L. A. et al., "Improved Emissions Performance in Today's Combustion System", AEG/SOA 7805, International Seminar, Jun. 1978, pp. 1 and 17.

Prediction and Measurement of a Non-Equilibrium Turbulent Diffusion Flame, Correa et al., 20th Symposium (International) on Combustion/The Combustion Institute, 1984, pp. 337-343.

Nitric Oxide Formation from Thermal and Fuel-Bound Nitrogen Sources in an Turbulent Nonpremixed Syngas Flame, Drake et al., 20th Symposium (International) on Combustion/The Combustion Institute, 1984/pp. 1983-1990.

$NO_x$ Formation in Lean Premixed Methane Flames, Correa, 89CRD001, Jan. 1989.

Low $NO_x$ Heavy Fuel Combustor Concept Program Phase IA Gas Test, Final Report, Apr. 1981.

Primary Examiner—Peter A. Nelson
Attorney, Agent, or Firm—Patrick R. Scanlon; James C. Davis, Jr.; Paul R. Webb, II

[57] ABSTRACT

A fuel with or without fuel bound nitrogen (FBN) is burned in a high pressure machine (20 atm) comprising fuel and air compressors, combustor and turbine at an ER of about 2-3 and temperature below the threshold for creating thermal $NO_x$. Prompt and FBN $NO_x$ are avoided due to the rich mixture, having a dearth of O and OH, producing CO and $H_2$ and little CH. The turbine cools the products to reduce their temperature. The cooled products are mixed with the remaining air and burned at a temperature below the thermal $NO_x$ threshold temperature at an ER of about 0.6. Commercial stand alone machines can be used for the rich and for the lean combustors wherein air and fuel are supplied to the rich combustor and only air and the cooled combustion products of the rich machine are supplied to the lean combustor.

5 Claims, 1 Drawing Sheet

DRY LOW NO$_x$ HYDROCARBON COMBUSTION APPARATUS

This application is a continuation of application Ser. No. 07/328,213, filed Mar. 24, 1989, and now abandoned.

This invention relates to hydrocarbon fuel burning processes and, more particularly, to such processes which include methodology for reducing NO$_x$ combustion products.

Hydrocarbon fuel burning processes are widely used in stationary power-generating gas-turbine systems. Combustion by-products which pollute the atmosphere are required to be minimized as part of a growing concern about the quality of the earth's atmosphere. Therefore, combustors for stationary power-generating gas-turbine systems are required to produce low levels of nitric oxides (NO, NO$_2$, N$_2$O, etc., collectively referred to as NO$_x$) and of CO. Such emissions lead to acid rain and other environmental problems. The NO$_x$ can result from reactions with atmospheric nitrogen, such reactions being referred to as "thermal" and "prompt" NO$_x$, or with fuel-bound nitrogen (FBN). According to well-supported combustion theory, NO$_x$ produced by the "thermal" mechanism is due to atmospheric nitrogen being fixed by the radicals responsible for flame initiation and propagation, as shown by the following:

$$N_2 + O = NO + N$$

$$N + O_2 = NO + O$$

$$N + OH = NO + H$$

with the net reaction rate approximately given by $$\frac{d[NO]}{dt} = 7.6 \times 10^{10} [N_2][O] \exp(-38000/T)$$

in System International (S.I.) units. Because of the large activation energy in the exponential term, the formation rate of NO$_x$ is not significant below about 2780° F., accounting for the descriptor "thermal".

The concentration of certain radical species is also important, particularly at low (on the order of atmospheric) pressures. The radicals can exist in superequilibrium concentrations as discussed in an article by S. M. Correa et al., entitled "Prediction and Measurement of a Non-equilibrium Turbulent Diffusion Flame," Twentieth (International) Symposium on Combustion, The Combustion Institute, pp. 337-343, 1984, and augment the thermal NO$_x$ mechanism. Since radical consumption reactions speed up at the relatively high pressures in power-generating systems, the degree of superequilibrium and the resultant excess radicals are reduced. For a further discussion on the formation of thermal NO$_x$ see the following articles: M. C. Drake et al., "Superequilibrium and Thermal Nitric Oxide Formation in Turbulent Diffusion Flames", Comb. Flame, 69, pp. 347-365, 1987; "Nitric Oxide Formation from Thermal and Fuel-Bound Nitrogen Sources in a Turbulent Non-Premixed Syngas Flame," Twentieth Symposium (Int.) on Combustion, The Combustion Institute, Pittsburgh, Pa., 1983-1990, 1984 and S. M. Correa "NO$_x$ Formation in Lean Premixed Methane Flames", Engineering Systems Laboratory, 89CRD001, January 1989.

The preponderance of thermal NO$_x$ in conventional (fuel and air not premixed) combustors, due to the high temperatures in the turbulent mixing interfaces, has led to water or steam injection for NO$_x$ control. In this approach, the injected water or steam absorbs heat, reduces the peak temperatures (to below the NO$_x$-forming threshold) and so reduces NO$_x$ emission levels. The lower temperatures have the undesirable side effect of quenching CO consumption reactions and so the CO levels increase and combustor life and efficiency are reduced. Thus the water or steam injection technique is not ideal.

Prompt NO$_x$ is so named because it is formed very rapidly (in hydrocarbon flames) when atmospheric nitrogen is fixed by alkyl radicals, e.g., CH, CH$_2$, CH$_3$. The latter occur in the hydrocarbon combustion kinetic chain. The nitrogen is fixed as cyanide (HCN, CN) species which lead to NH$_i$ species and are eventually oxidized to NO$_x$ by oxygen-containing radicals. The mechanism does not require the high temperatures of the thermal mechanism and so prompt NO$_x$ is not amenable to control by water or steam injection. FBN NO$_x$ is very similar in that the fuel-bound nitrogen species are extracted as NH$_i$ species which are oxidized to NO$_x$. FBN occur for example, in coal, and also in so-called "dirty" gas derived from coal. However, prompt NO$_x$ is not as much a problem as FBN. In typical applications, FBN NO$_x$ can be on the order of 500 ppm or more, while (conventional) combustors with non-FBN fuel have 100-300 ppm thermal NO$_x$ and 10-30 ppm prompt NO$_x$. It would be desirable to burn dirty (FBN) fuel with <100 ppm NO$_x$ and clean fuel with <10 ppm NO$_x$.

Powerplant constraints dictate that the stability, turn-down ratio (i.e. power changes corresponding to power demand reductions) and efficiency be similar to those of current equipment. NO$_x$ control techniques without water or steam injection are referred to as "dry" combustion. Two dry low-NO$_x$ combustion techniques have been suggested (i) rich-lean staged combustion (originally intended for thermal and FBN NO$_x$ control but not successful for the reasons discussed below) and (ii) lean premixed combustion (intended for thermal NO$_x$ control).

In rich-lean staged combustion, the combustor is divided into a first zone which is rich (equivalence ratio $\Phi \approx 1.3$-$1.8$; note that $\Phi = 1$ for stoichiometric conditions, $\Phi > 1$ being rich and $\Phi < 1$ being lean) and a second zone which is lean. Because of the off-stoichiometric conditions, temperatures in each zone are too low for NO$_x$ (e.g. less than 2780° F.) to form via the "thermal" mechanism.

However in prior art staged systems, the mixing of air with the efflux of the rich zone occurs at finite rates and cannot prevent the formation of hot near-stoichiometric eddies. The attendant high temperatures lead to the copious production of thermal NO$_x$, which is triggered at temperatures above about 2780° F. This has been the experience both in the laboratory and in mainframe (100 MW class) gas-turbine equipment. However, rich combustors are suitable for fuels with a significant fuel-bound nitrogen content because the amount of oxygen available to produce FBN NO$_x$ is limited.

Lean premixed combustors, which are useful if the fuel does not contain nitrogen, are fueled by a lean (prevaporized, if liquid fuel) premixed fuel-air stream at $\Phi \approx 0.7$. The ensuing temperatures are uniformly too low (e.g., less than 2780° F.) to activate the thermal NO$_x$ mechanism. Detailed chemical kinetic studies of two such combustors by the present inventor have lead to the discovery that most of the $NO_x$ is produced by the "prompt" $NO_x$ mechanism described above (recall that FBN is not present). This forms a lower limit to the minimum $NO_x$ obtainable in current hydrocarbon-fueled combustors. Advanced combustors under development by the assignee of the present invention have reached an apparent 30-40 ppm $NO_x$ barrier (using clean natural gas which minimizes total $NO_x$ production). This barrier can be crossed only with an increase in CO and an unacceptable loss of flame stability. Such (lean) combustors also produce unacceptably high levels of $NO_x$ from FBN species in the fuel if FBN species are present. Thus each of the prior art systems has advantages and disadvantages.

According to the present invention, the efflux of a rich combustor is cooled to prevent ignition during mixing to a lean condition. Ignition and flame stabilization occur only after the lean mixture has been established. According to one embodiment, a portion of the air is burned under rich conditions (e.g., overall equivalence ratio, $\Phi=2.5-3.0$) in a preburner to produce a partially combusted stream which contains CO and $H_2$, referred sometimes as syngas, and very little $CH_4$ (the original fuel), $CO_2$ and $H_2O$. The hot gas stream is then cooled by way of example by expansion through a turbine or passage through a heat exchanger. The cooled gas stream is then mixed with the remaining portion of the air stream, without ignition. The lean stream (e.g., $\Phi=0.5-0.6$) is then burned.

The production of $NO_x$ is minimized due to the relatively cool temperatures in the rich and lean burning cycles, which temperatures are below the established level for the production of thermal $NO_x$. Prompt $NO_x$ is also minimized since CH in the lean cycles tends to be negligible. FBN $NO_x$ is minimized because the rich combustor runs with too little oxygen for production of $NO_x$.

Figure 1:
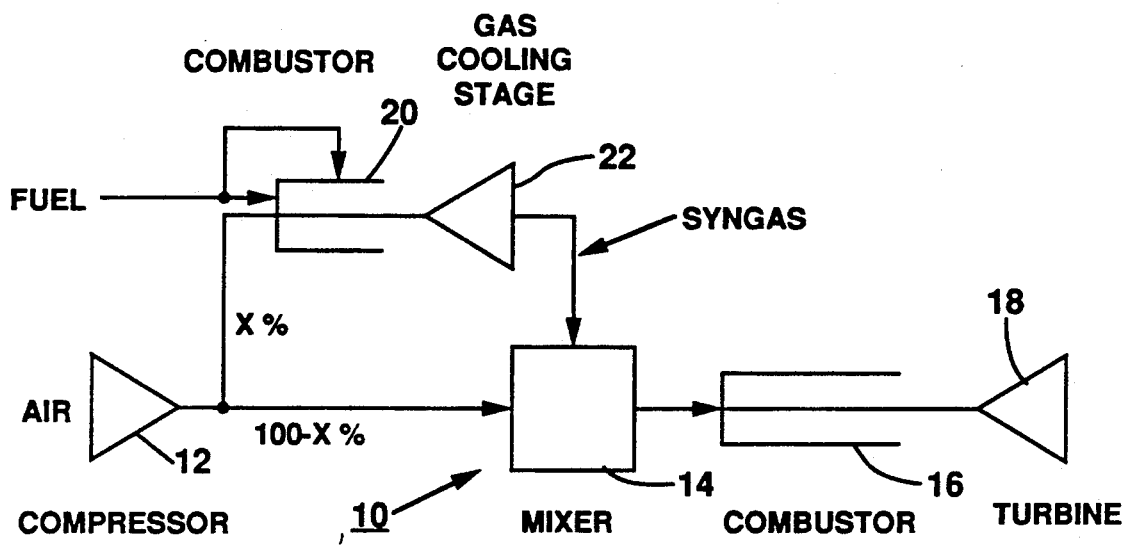
FIG. 1 is a schematic diagram of a combustion cycle in accordance with one embodiment of the present invention.

In the schematic diagram of FIG. 1, a representative combustion system in accordance with one embodiment of the present invention is illustrated. In the system shown a main combustion machine 10 comprises a compressor 12, a gas mixer 14 and a primary combustor 16 whose combustion products drive turbine 18. A system comprising compressor 12, mixer 14, combustor 16 and turbine 18 are commercially available mainframe machines, which for example, may be a General Electric Company MS7000 series machine for driving a 100 megawatt class electrical generator. A second combustor 20 is coupled to receive 100% of the fuel at an inlet thereof which fuel preferably is methane, coal or coal derived gas or a liquid hydrocarbon fuel. The output of combustor 20 is applied to a gas cooling stage 22 which may comprise a turbine or expansion nozzles to cool the gas produced by the combustor 20. The inlet of combustor 20 receives x% of air from the compressor 12. The remaining portion of the air 100−x% is applied to the mixer 14 of the mainframe machine 10.

Combustor 20 may be similar in construction as the combustor in a commercially available gas turbine generator known as a General Electric Company model LM500. The LM500 however, includes a fuel compressor and air compressor for compressing the fuel and air supply to the combustor 20. In the embodiment of the machine 10 however, the air compressor is not included as the air is compressed via compressor 12 and the fuel is compressed and supplied to the input of combustor 20. The cooling stage 22 may include a turbine as available in the model LM500 gas generator. However, a turbine is not essential for the gas cooling stage as indicated above.

100% of the fuel is applied to the combustor 20 which burns that fuel in a rich combustion mixture with a relatively low amount of air supplied via the compressor 12. For example, the amount of air supplied to combustor 20 may be 10% of the air supplied to the mixer 14 from compressor 12. The combustion products are applied to the cooling stage 22 while at a relatively hot temperature. The temperature is below about 2780° F. at which thermal $NO_x$ is generated. Because of the rich combustion, little oxygen is available for the combustion process in combustor 20 and the temperature thereof does not exceed the threshold temperature at which thermal $NO_x$ is generated. The relatively rich characteristics of the burning process generates little O, OH and other oxidizing radicals in the burning process minimizing prompt $NO_x$. Also, the rich combustion process favors reforming chemistry, i.e. tends to avoid the generation of CH gas products; instead produces gas products comprising primarily CO and $H_2$. The CO and $H_2$ mixture is commonly referred to as syngas or synthetic gas. The FBN species, if present, are converted to $N_2$ (molecular nitrogen).

The combustion efficiency of combustor 20 is believed to be generally about 75% and therefore about 25% of the fuel in the syngas products remains unburned. Combustor 20 because it is relatively rich operates at an equivalence ratio (ER) of approximately 2.5-3. Of course, the equivalence ratio will vary between the head end and the exit of the combustor 20. The exit ER is in the range indicated, the head end being lower, within the rich stability limit. The combustor 20 is illustrative of a more complex system in which a staged combustor may be provided with more fuel added to the products of a rich primary zone having a $\Phi$ of approximately 2. The added fuel promotes "reforming" chemistry. Because the temperature is below the threshold value for the generation of thermal $NO_x$, such thermal $NO_x$ is substantially negligible at the output of combustor 20. The combustor process maximizes CO and $H_2$ and fuel conversion.

The cooling stage 22 may be either a turbine or a heat exchanger to cool the hot syngas produced by the combustor 20 and deliver power or heat as may be required in a given implementation. The output of such a turbine or heat exchanger is such to cool the syngas to a temperature below ignition temperatures before delivery to the mixer 14 in the system 10. This step is critical.

In accordance with the principles of the present invention, the syngas produced by the rich combustor 20 has negligible total $NO_x$ because of the low temperature and the lack of oxidizing species. FBN species are converted to $N_2$. However, in the transition to the mixer 14 it is important that the syngas be reduced to a temperature sufficiently low that the temperatures in the process of turbulent mixing in mixer 14 remain below the threshold for the generation of thermal $NO_x$. Without the cooling produced by stage 22 the hot syngas produced by the combustor 20 when mixed with air in the mixer 14 could lead to ignition and flame in mixer 14 and to copious thermal $NO_x$. Because there is little CH component in the syngas product of the combustor 20, there is little prompt $NO_x$ in the system 10.

It should be understood that the combustors 16 and 20 include more complex combustion systems including primary burners (head ends) and downstream addition of air in the case of combustor 16, per conventional practice, and downstream addition of fuel in the case of combustor 20. Assuming a preburner is included in the combustor 20, then the cooling stage 22 may be provided a pressure reducing nozzle which will increase the usual approximately 4% pressure drop available for mixing. Air needed to premix to lean main-combustor conditions is admitted via jets within such a nozzle (not shown). With the use of a nozzle, integration may be accomplished because the cooling and premixing can both occur within the nozzle. In this case the mixer 14 would be combined in such a nozzle with the mixing occurring in the nozzle. Otherwise the mixer 14 mixes the cooled syngas which is at a temperature below the 2780° F. threshold temperature for the generation of thermal $NO_x$, and mixes that air gas at compressor temperature, for example, 600° F.

The mixing of the syngas with most of the air stream produces a lean premixed stream having an equivalence ratio $\Phi$ of approximately 0.5 at the head end of the combustor 16 and about 0.3 at the exit. The mixing process of mixer 14 or nozzles (not shown) is at a sufficiently low temperature so that a flame and thermal $NO_x$ cannot be formed during dilution.

Relatively negligible amounts of hydrocarbons are available at the mixer 14 since only air from the compressor 12 is added at the mixer 14 to the syngas produced by the combustor 20. Therefore, very little prompt $NO_x$ is generated in combustor 16. The particular operating points for the fuel and air mixers and pressures and temperatures can be selected by analysis and experimental variations of the components for a given implementation. In particular, the stoichiometries of the combustors 16 and 20 are optimized for producing maximum power at the turbine 18. Not shown is an electrical generator or other utilization means coupled to the turbine 18 and driven thereby.

Because the generation of hydrocarbons and FBN $NO_x$ are minimized in the syngas output or the cooling stage 22 and because the generation of the thermal $NO_x$ is minimized by maintaining the temperatures below the threshold, the fuel supplied to combustor 20 may comprise coal gas, liquid fuels and other types of fuels with relatively high fuel bound nitrogen. Employing the process as discussed above in connection with FIG. 1, the fact that the fuels used in the combustor 20 are rich in nitrogen will not affect the resulting products in the syngas at the output of the cooling stage 22. Nitrogen in FBN species will be converted to $N_2$.

By way of example, combustor 20 may be supplied with approximately 0.5 lbs. per second of methane ($CH_4$) accompanied with 2.5 lbs. per second of air. The combustor 20 as mentioned above has an overall equivalence ratio of about 3. The syngas output of the cooling state 22 comprises approximately a flow rate of 1 lb. per second of carbon monoxide plus hydrogen ($CO+H_2$) the rest being mostly $N_2$ (nitrogen). This is combined with about 15 lbs. per second of air which is applied to the mixer 14. Air for providing dilution and cooling is provided to the combustor 16 at approximately 7.5 lbs. per second to provide a downstream exit equivalence ratio $\Phi$ of approximately 0.3. This process yields an approximate $NO_x$ level of 5 ppm $NO_x$. It should be understood that the combustors 20 and 16 are supplied fuel and air at various inputs at the head end and downstream inputs in accordance with conventional combustors. Combustor 16 uses air for downstream inputs while combustor 20 uses fuel for downstream inputs.

Figure 2:
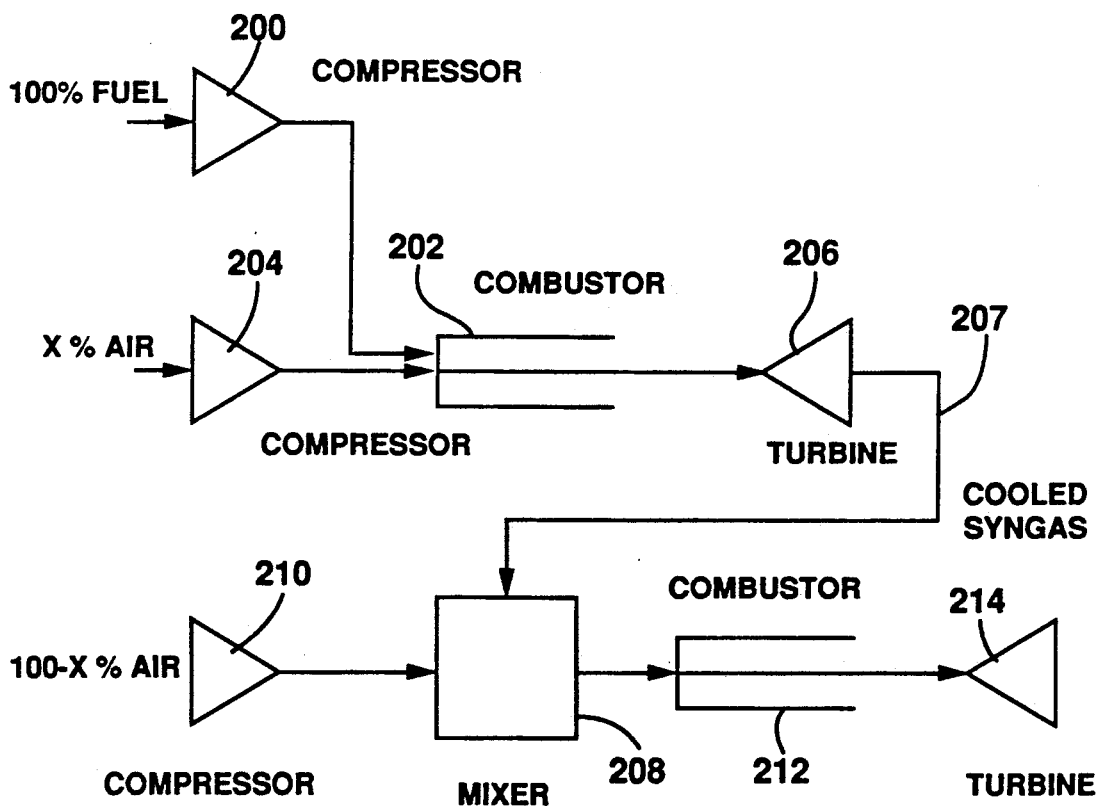
FIG. 2 is a schematic diagram of a combustion cycle in accordance with a second embodiment of the present invention.

In FIG. 2, a second embodiment employing two stand alone commercially available combustion machines are employed for implementing the present invention. A compressor 200 compresses all of the hydrocarbon fuel such as methane to a pressure of about 20 atmospheres and applies the compressed fuel to combined combustor mixer 202. The compressor 204 supplies a portion x% of the total air required overall. Compressor 204 supplies the compressed air to the combustor 202. Combustor 202 consists of a head end operated near the rich limit with downstream addition of more fuel to achieve the required stoichiometry. By way of example, x may be 10% of the air required overall. Combustor 202 burns the fuel air mixture and applies the burned combustion products to a turbine 206. The purpose of the turbine 206 is similar to the cooling stage 22 of FIG. 1 which provides cooling of the hot combustion gases to produce a cooled carbon monoxide (CO) and hydrogen ($H_2$) syngas. The cooled syngas is applied to the input of mixer 208. The remaining air required is applied to compressor 210. For example, where 10% of the air is applied to compressor 204, 90% of the air required to burn overall is applied to compressor 210. Compressor 210 provides a pressure of about 10 atmospheres to the air supplied to the mixer 208. Mixer 208 mixes the air from compressor 210 with the cooled syngas from turbine 206. The mixed cooled gas product is applied to combustor 212 whose hot gas products are exhausted to a turbine 214 which drives a generator (not shown).

In one calculation example to verify the process, a 0.5 lbs per second of methane is supplied as the fuel to compressor 200. This is applied at atmospheric pressure at room temperature (60° F.). To this is added 0.3% $NH_3$ (ammonia). The ammonia represents fuel bound nitrogen in a coal derived gaseous fuel. The efficiency of fuel compressor 200 is assumed approximately 0.9. The output of compressor 200 has a temperature of about 677° F.

Compressor 204 compresses 2.86 lbs. per second of air supplied at atmospheric pressure at room temperature. The output of compressor 204 is at approximately 842° F. with the outputs of both compressors 200 and 204 at 20 atmospheres. Combustor 202 mixes the fuel and air and burns the combination with $\Phi$ at about 2.0 at the head end and 3.0 at the exit port. The output of the rich combustor 202 has a temperature of about 2520° F. It is calculated that the products from the combustor 202 have less than 1 ppm $NO_x$ which value increases as the equivalence ratio decreases. It is also estimated that there are about 750 ppm $NH_i$, HCN. The gas products from combustor 202 are applied to turbine 206 which runs at about a 2 to 1 pressure ratio which serves to cool the combustor gas products, producing a cooled syngas on line 207.

Combustor 202 burns a rich fuel air mixture to which more fuel is added in the downstream region of the combustor. This leads to reduction of the initial products by the fuel added downstream. The process is referred to as "reforming" chemistry such that the products of the syngas on line 207 are primarily CO and $H_2$ rather than fuel and combustion products. The $NO_x$ emissions are low on line 207 due to the relatively low temperatures and lack of oxidizing radical species such as O and OH in combustor 202. This has been verified by laboratory experiments and kinetic studies. The output pressure of the turbine 206 on line 207 is at about 10.5 atmospheres and at a temperature of about 2136° F. If the equivalence ratio in the head end of combustor 202 is made too high, the flame can become unstable in the combustor. There may also be excessive soot because the combination of gas, fuel and air is too rich. Further, there can be excessive production of $NO_x$ as the $\Phi$ is lowered. For this reason, it is preferred that the head end $\Phi$ of combustor 202 be in the range of 2 to 2.5, with more fuel added downstream.

Compressor 210 receives the remaining air. This air is applied to compressor 210 at a rate of 25.74 lbs. per second, in this example, at room temperature and atmospheric pressure. Compressor 210 operates at an efficiency of 0.9. The output pressure of compressor 210 is 10 atmospheres at a temperature of about 600° F. This air is mixed in mixer 208 with the cooled syngas and applied to lean combustor 212. The lean combustor 212 has a head end $\Phi$ of about 0.6 and an exit $\Phi$ of about 0.3. Combustion products at the exit of combustor 212 are at about 1860° F., and exhibit approximately 58 ppm $NO_x$ and less than 1 ppm CO. Recall that the fuel contained FBN (0.3%). Turbine 214 operates with an assumed efficiency of 0.9 and has an output temperature of about 1005° F. at one atmosphere. The 58 ppm $NO_x$ and less than 1 ppm CO products produced by the combustor 212 is considered excellent in view of the combustion of dirty fuel containing 3% ammonia applied to the compressor 200. Normally, such dirty fuel will produce hundreds of ppm of $NO_x$. Of course, different ratios of fuel, air and dirty fuel contaminants such as FBN will produce different values of temperature at the different stages. The 10% air applied to the compressor 204 and 90% air applied to compressor 210 is believed optimum for one implementation. Turbine 214 is then employed to operate an electric generator or other utilization means.

Turbine 206 causes expansion of the combustor output gases and reduces the temperature of the syngas to a level where mixing can be accomplished in mixer 208 without premature ignition. The turbine 206 exit pressure is larger than the operating pressure of the combustor 212 by about 5% (10.5 atm vs 10 atm) to facilitate mixing of the syngas from line 207 and the air from compressor 210 to an overall lean condition. The figures given above with respect to the proportions of fuel to air, efficiencies of the compressors and turbines and approximate temperatures are based on calculations of the various operating points, emissions and overall thermal efficiency. The various assumptions are included in these calculations as indicated.

The total fuel and air flow rate are consistent with combustor cans in current mainframe power generation machines. Calculation of the cycle efficiency of the embodiment of FIG. 2 shows the cycle efficiency of 30.7% to be comparable to a base machine comprising compressor 210, mixer 208 and combustor 212 with the same level accuracy in the calculation, that is a cycle efficiency of 30.5%. Slight improvement in the cycle efficiency is due in part to the straight forward improvement of the Brayton cycle with the designated pressure ratios, since the combustor 202 runs at 20 atmospheres pressure as compared to the 10 atmosphere pressure of combustor 212.

What is claimed is:

1. Gas turbine apparatus for dry low $NO_x$ combustion comprising:

a first gas turbine set including a first compressor means for compressing incoming air to about 20 atmospheres, a first combustor having fuel injector means and being coupled to said first compressor means, said first combustor having an exit equivalence ratio of about 2.0 to 3.0 so as to produce hot combustion products comprising substantially CO and $H_2$ and negligible $NO_x$, and first turbine means coupled to the output of said first combustor for cooling the hot combustion products below a temperature at which ignition and thermal $NO_x$ occur; and a second gas turbine set including a second compressor means for compressing incoming air to about 10 atmospheres, a mixer coupled to said second compressor means for receiving air from said second compressor means, said mixer also coupled to the output of said first turbine means, the output pressure of said first turbine means being about 5% higher than the output of said second compressor, so that rapid and homogeneous mixing in the mixer is assured, a second combustor having fuel injector means coupled to the output of said mixer, said second combustor having an exit equivalence ratio of about 0.2 to 0.3, so that production of $NO_x$ and CO is minimized, and second turbine means coupled to the output of said second combustor.

2. The gas turbine apparatus of claim 1, wherein the quantity of air supplied by said second compressor means is approximately ten times the quantity of air supplied by said first compressor means.

3. The gas turbine apparatus of claim 2 wherein the temperature of the output of said first compressor means in approximately 840° F. and the temperature of the output of said second compressor means is approximately 600° F.

4. The apparatus of claim 3 wherein the temperature of the combustion products at the exit of the first turbine means is approximately 1860° F. at a pressure of 10.5 atmospheres and the temperature of the combustion products at the exit of the second turbine means is approximately 1005° F. at a pressure of 1 atmosphere.

5. A gas turbine apparatus for dry low $NO_x$ combustion comprising:

a compressor for compressing incoming air;

a first combustor connected to said compressor for receiving a portion of the compressed air from the compressor and having fuel injection means for receiving fuel, said first combustor having an exit equivalence ratio of about 2.0 to 3.0 so as to produce hot combustion products comprising substantially CO and $H_2$ negligible $NO_x$;

cooling means connected to said first combustor for cooling the hot combustion products below a temperature at which ignition and thermal $NO_x$ occur;

a mixer having inlet means and outlet means, said inlet means being connected to said cooling means for receiving the cooled combustion products and to said compressor for receiving the remaining portion of the compressed air;

a second combustor connected to said outlet means of said mixer for receiving the output of said mixer, said second combustor having an exit equivalence ratio of about 0.2 to 0.3, so that production of $NO_x$ and CO is minimized; and turbine means connected to said second combustor for being driven by the output of said second combustor.

* * * * *